United States Patent
Biedenkopf et al.

(10) Patent No.: US 7,125,530 B2
(45) Date of Patent: Oct. 24, 2006

(54) METHOD OF PRECIPITATING SLAGS FROM FLUE GAS WITH A CERAMIC

(75) Inventors: Peter Biedenkopf, Kirchseeon (DE); Michael Müller, Würselen (DE); Klaus Hilpert, Jülich (DE); Lorenz Singheiser, Jülich (DE)

(73) Assignee: Forschungszentrum Julich GmbH, Julich (DE)

( * ) Notice: Subject to any disclaimer, the term of this patent is extended or adjusted under 35 U.S.C. 154(b) by 184 days.

(21) Appl. No.: 10/362,803

(22) PCT Filed: Aug. 24, 2001

(86) PCT No.: PCT/DE01/03157

§ 371 (c)(1),
(2), (4) Date: Feb. 24, 2003

(87) PCT Pub. No.: WO02/18293

PCT Pub. Date: Mar. 7, 2002

(65) Prior Publication Data

US 2003/0175189 A1    Sep. 18, 2003

(51) Int. Cl.
*B01D 47/00*    (2006.01)

(52) U.S. Cl. ...................................... 423/210; 423/324

(58) Field of Classification Search ................. 423/210, 423/324

See application file for complete search history.

(56) References Cited

U.S. PATENT DOCUMENTS

| 2,598,904 A | 6/1952 | Gebler et al. |
| 3,798,040 A | 3/1974 | Kamin et al. |
| 6,093,366 A | 7/2000 | Kato et al. |

FOREIGN PATENT DOCUMENTS

| DE | 196 26 656 A1 | 1/1998 |
| JP | 09175854 | 7/1997 |
| JP | 10087364 | 4/1998 |
| JP | 11 71169 | 3/1999 |
| JP | 11-320028 | 11/1999 |

OTHER PUBLICATIONS

Colloidal Stability and Sintering of Yttria-Silica . . . (Journal of EP Ceramic Soc. 19-1999), no month.
Oxidation Protection Coatings . . . (Journal of EP Ceramic Soc. 18 (1998), no month.

*Primary Examiner*—Edward M. Johnson
(74) *Attorney, Agent, or Firm*—Andrew Wilford

(57) ABSTRACT

The invention relates to a ceramic material comprising at least one transition metal silicate and/or transition metal disilicate. The ceramic material can be characterized by having one or more monosilicates, one or more disilicates and mixtures consisting of monosilicates and disilicates.

7 Claims, No Drawings

METHOD OF PRECIPITATING SLAGS FROM FLUE GAS WITH A CERAMIC

CROSS REFERENCE TO RELATED APPLICATIONS

This application is a national stage of PCT/DE01/03157 filed 24 Aug. 2001 and based upon German National Application 100 42 026.5 of 26 Aug. 2000 under the International Convention.

FIELD OF THE INVENTION

The invention relates to a ceramic material which comprises at least one transition metal silicate and/or transition metal disilicate.

BACKGROUND OF THE INVENTION

Worldwide known recoverable reserves of nonrenewable (fossil) energy sources amount to about 1200 Mrd. t BCU (BCU=bituminous coal units=29.3 $10^9$ J). The principal energy carrier is coal. It makes up 49.2%, of which 43.5% is hard coal and 5.7% is lignite. Thus processes for driving coal-fired gas power plants and steam power plants (G & S power plants) as well as other modern power plants have been developed to use pressurized coal dust firing technology (PCDF technology). The PCDF technology utilized in G & S power plants does not utilize natural gas, but rather coal under high pressures (10 to 20 bar) and burns the coal to produce hot gas under pressure which is used to drive a gas turbine. Because of the mineral content of the coal, the resulting flue gas must however be cleaned before it can be used in the gas turbine. Liquid slag particles and their main component, $SiO_2$, especially must be removed. Up to now for this purpose a direction-change system has been provided in which the flue gas impinges on the surfaces of ceramic materials and the slag which there agglomerates can flow off in a liquid film which is removed by gravitation from the surfaces and thus from the flue gas stream. The deflection system includes precipitating devices for the slag, especially in the form of baffle plates or ball packings. For the liquid ash separation at the present time $Cr_2O_3$ or melt-cast $Cr_2O_3$-containing ceramics are used since $Cr_2O_3$ is the single ceramic which has sufficient corrosion-resistance in contact with a flowing coal slag. The stability of the chromium oxide derives from the fact that $Cr_2O_3$ undergoes no chemical bonding with the main component of the coal slag, $SiO_2$, and does not form ternary mixed oxides. Similar characteristics with respect to reactions with $SiO_2$ have been recognized previously only for $UO_2$ and $ThO_2$, but because of their radioactivity, these compounds have not been used.

A problem with $Cr_2O_3$-containing ceramics is that they, under power plant conditions and high steam pressures, tend to evaporate, whereby in an oxidizing atmosphere the volatile species $Cr_2O_3$ and $CrO_2(OH_2)$ arise. Under PCDF conditions, the vaporization is yet more intensive since there a significantly higher temperature prevails on the one hand and on the other the chromium evaporation is about an order of magnitude more intensive because of the sodium oxide and potassium oxide of the carbon slag so that $Cr_2O_3$-containing ceramics also because of a cancer-producing effect of vaporized $Cr^{6+}$ compounds cannot be treated as appropriate ceramics for liquid ash separation over longer periods.

Especially for the PCDF technology, ceramic materials are required that have the following characteristics:

1) Thermodynamic stability and corrosion-resistance at temperatures between 1250 and 1500° C. in an oxidizing atmosphere.

2. Low solubility and chemical stability in contact with a flowing coal slag with constituents like: $SiO_2$, $Al_2O_3$, CaO, $Fe_2O_3$, MgO, $K_2O$ and $Na_2O$.

3. No formation of volatile toxic products.

OBJECT OF THE INVENTION

It is therefore the object of the invention to provide a ceramic material which has long-term stability at high temperatures in oxidative and/or moist milieus, especially for the deposition of liquid components from flue gas in power plants and refuse incinerator apparatus, which can be used without the liberation of volatile, toxic compounds, and with which chemical. Chemical reactions with $SiO_2$ can be suppressed.

DESCRIPTION OF THE INVENTION

The objects are achieved with a ceramic material at least one transition metal silicate or a transition metal disilicate. By "transition metal" a metal according to the IUPAC nomenclature (1985) is meant. The transition metal can be an element from the third through twelfth subgroups (scandium to mercury, atomic numbers 21–30, 39–48 and 57–80) of the periodic table, also including the elements of the lanthanide series (lanthanum to lutetium, atomic numbers 57–71) as well as the elements of the actinide series (actinium through lawrencium, atomic numbers 89–103).

Transition metal silicates are comprised of at least one equivalent of transition metal oxide and one equivalent of $SiO_2$. They have, like the transition metal disilicates with trivalent transition metals as oxidic components, a mixing gap to $SiO_2$. The expression "mixing gap" is primarily used in the description of phase diagrams. Thus $Cr_2O_3$ forms with $SiO_2$ over the entire range of variation (0 to 100% $SiO_2$ or 100% $Cr_2O_3$ to 0% $Cr_2O_3$) a mixing gap, i.e. in the entire phase diagram $Cr_2O_3$—$SiO_2$ there is no formation of a ternary phase from $SiO_2$ and $Cr_2O_3$. Above the melting point of $SiO_2$ (1725° C.) there is not only liquid $SiO_2$ but also solid $Cr_2O_3$ without a reaction occurring. This applies also for the claimed transition metal silicates and the transition metal disilicates, which as solids at high temperatures do not react with $SiO_2$.

Advantageously the ceramic is comprised of a transition metal from the third or fourth subgroup of the periodic table or the group of lanthanides. These are stable at temperatures above 1300° C. in moist oxidative environments.

In a feature of the invention, the ceramic is comprised of a silicate of the formula $M_2SiO_5$ or $M_2Si_2O_7$, (where M=transition metal). The term "silicate" here encompasses corresponding monosilicates or disilicates with a transition metal oxide of the formula $M_2O_3$ and one equivalent of $SiO_2$ (for transition metal monosilicates) and two equivalents of $SiO_2$ (for transition metal disilicates). The transition metal is in the trivalent state.

Especially advantageously the ceramics comprise scandium, yttrium, lanthanum, cerium, samarium and/or dysprosium predominantly as metal oxides. With these compounds, monosilicates and disilicates are obtainable which empirically are found to have unusual stability at temperatures higher than 1300° C. The metal oxides are economical and easily obtainable commercially. Mixtures of different metals within one ceramic are possible.

It has been found that a ceramic can also be a silicate of of the formula MSiO$_4$ (where M=transition metal). The transition metal is then in a quadrivalent state in the metal oxide (MO$_2$), and the silicate contains then one equivalent of SiO$_2$.

If the ceramic is characterized primarily by zirconium and/or hafnium as the metal oxide, the monosilicate which is formed is especially corrosion-resistant and has long-term stability at high temperatures. In the use of several different quadrivalent transition metals, like in the case of use of several different trivalent transmission metals, mixtures of the transition metal silicates in one ceramic are possible.

In a further feature of the invention the ceramic contains 50 to 66 mol % SiO$_2$. Apart from the previously-mentioned mixtures of monosilicates or of disilicates in one ceramic, mixtures of mono and disilicates in a single ceramic are also possible. As a consequence a high variability in the selection of the starting compounds is possible and as a consequence a wide spectrum of monosilicates and/or disilicates can be synthesized.

Especially advantageous are the ceramics which are characterized by a melting point greater than 1500° C. For these high temperature-resistant ceramics the fields of use in technology are substantially unlimited and can include, for example, the liquified ash separation in pressurized carbon dust firing (PCDF).

In a further feature of the invention, the ceramic comprises a refractory ceramic which is surface-coated with transition metal silicates and/or transition metal disilicates. The refractory ceramic then comprises a protective layer with the application of transition metal silicates and/or transition metal disilicates s processes for the surface coating, for example, hot isostatic pressing (HIP), cold isostatic pressing or sintering. The transition metal silicate or transition metal disilicate refractory ceramic, by comparison with hitherto used ceramics consisting of solids composed entirely of Cr$_2$O$_3$ materials, have significant material cost savings.

Advantageously separating apparatus, especially for the liquified ash separation in the pressurized carbon dust firing technology, comprises such a ceramic. By "separating apparatus" is meant packings, baffle plates, porous ceramics and others without the need to set out especially the choice of geometry. It is therefore not significant whether one uses a ball packing or packing of some other geometry. Separating apparatus like packings, baffle plates or porous ceramics which comprise such a ceramic in accordance with the invention enable a liquified ash separation without liberation of volatile toxic components.

Especially advantageously, a coal-operated gas and steam power plant comprises such a ceramic. Thus the pressurized coal dust firing technology is usable also for gas and steam power plants.

Furthermore, melting vats, especially for vitrification technology can comprise such ceramics (claim 12). In this manner toxic components of the filter ash from garbage incineration can be fixed. One then utilizes the fact that the transition metal silicates and/or transition metal disilicates are chemically inert with respect to SiO$_2$. It is also conceivable to use a ceramic with transition metal silicates and/or metal disilicates, based upon their electrically insulating characteristics, as sealing and insulating material in the edge regions of fuel cells or fuel cell stacks.

The object of the invention is, in addition, to provide a method of operating a coal-firing gas and steam power plant (claim 13). In that case a fuel is combusted under pressure;

a hot gas is conducted onto a separating device which comprises ceramic with transition metal silicates and/or transition metal disilicates;

the liquid particles are removed.

The ceramic can comprise transition metal silicates (one or more monosilicates), transition metal disilicates (one or more disilicates) or also mixtures of mono and disilicates. Through the mixing gap of SiO$_2$, the main component of the coal slag, efficient removal of the latter by agglomeration from the flue gas can be effected whereby gas power plants and steam power plants can be fired with coal without the liberation of toxic species (pressurized coal dust firing).

A method of operating a coal, wood, biomass or clarifier sludge gasifier is characterized by the steps of:

gasifying fuel or substoichiometrically burning fuel, guiding the hot gas onto a separating device which comprises a ceramic with transition metal silicates and/or transition metal disilicates, removing the liquid particles (claim 14).

By substoichiometrically is meant a combustion or gasification in which the oxygen is present in less than an amount sufficient for complete combustion whereby the resulting weak gas (CO, CH$_4$, H$_2$) can be converted thermally to recover energy. The advantage resides in that the use of many fuels, especially even straw, is possible.

A method of operating a disposal plant for filter ash from garbage incinerators resides in that ash from garbage incinerators is heated in a melting vat which is comprised of a ceramic with transition metal silicates and/or transition metal disilicates by heating above the melting point of the filter ash, and the filter ash is vitrified (claim 15).

Ceramics with transition metal silicates and/or transition metal disilicates can thus be used in general wherever liquid, SiO$_2$-rich slag must be separated from a flue gas stream at high temperatures or wherever ceramic material at high temperatures is in contact with an SiO$_2$-rich liquid.

As an example for a high melting point ceramic with monosilicate and a disilicate is a mixture in proportions of 1:1 of Y$_2$SiO$_5$ and Y$_2$Si$_2$O$_7$ whereby such a ceramic has a SiO$_2$ content of 58 mol % SiO$_2$. The ceramic can be produced by reaction sintering in a hot isostatic press. The resulting ceramic has the advantage that the monosilicate component is taken up by contact with a silicate-rich liquid SiO$_2$ whereby the surface porosity of the ceramic is minimized in situ. This increases stability of the ceramic against corrosion and minimizes the penetration of slag in the solid body.

The invention claimed is:

1. A method of precipitating SiO$_2$-rich slags from a flue gas stream which comprises contacting the gas stream with a ceramic comprised of at least one transition metal silicate and/or transition metal disilicate with a mixing gap between the transition metal silicate and/or the transition metal disilicate and the SiO$_2$ of the slag, the precipitation of SiO$_2$ rich slag being effected from the hot flue gas of a coal-fired gas and steam power plant.

2. A method according to claim 1 which comprises the steps of:

burning fuel under pressure, guiding the hot gas onto a separating device which comprises the ceramic with transition metal silicate and/or transition metal disilicate, and removing liquid particles from the hot gas.

3. The method according to claim 2 wherein the flue gas is produced by the use of pressurized coal-dust firing technology.

4. A method of precipitating $SiO_2$-rich slags from a flue gas stream which comprises contacting the gas stream with a ceramic comprised of at least one transition metal silicate and/or transition metal disilicate with a mixing gap between the transition metal silicate and/or the transition metal disilicate and the $SiO_2$ of the slag, the precipitation of $SiO_2$-rich slag being effected from the hot flue gas of a coal, wood, biomass or clarifier sludge gasifier.

5. The method according to claim 4 which comprises the steps of:
gasifying or burning fuel substoichiometrically,
guiding the hot gas onto a separating device which comprises the ceramic with transition metal silicate and/or transition metal disilicate, and
removing liquid particles from the hot gas.

6. A method of precipitating $SiO_2$-rich slags from a flue gas stream which comprises contacting the gas stream with a ceramic comprised of at least one transition metal silicate and/or transition metal disilicate mixing gap between the transition metal silicate and/or the transition metal disilicate and the $SiO_2$ of the slag, the precipitation of $SiO_2$-rich slag being effected from the flue gas of a disposal plant for filter ash from garbage incinerators.

7. The method according to claim 6, further comprising the steps of:
heating the ash from garbage incinerators in a melting tub which comprises the ceramic with transition metal silicate and/or transition metal disilicate over the melting point of the filter ash, and
vitrifying the filter ash.

* * * * *